United States Patent [19]
Morgan

[11] 4,430,032
[45] Feb. 7, 1984

[54] PEDESTAL CONTAINER LOCKING DEVICE
[75] Inventor: David P. Morgan, Hanover Park, Ill.
[73] Assignee: Portec, Inc., Oak Brook, Ill.
[21] Appl. No.: 304,670
[22] Filed: Sep. 22, 1981
[51] Int. Cl.³ .......................... B60P 1/64; B60P 7/13; B61D 5/06
[52] U.S. Cl. ..................................... 410/68; 105/360; 292/210; 410/70; 410/76; 410/80
[58] Field of Search .................. 292/210; 410/69, 70, 410/71, 72, 73, 74, 75, 76, 77, 78, 80, 81, 68; 105/360

[56] References Cited
U.S. PATENT DOCUMENTS

| 1,471,111 | 10/1923 | Eder | 410/78 |
|---|---|---|---|
| 2,771,040 | 11/1956 | Folmsbeg | 410/68 |
| 3,391,654 | 7/1968 | Grob et al. | 410/75 |
| 3,417,712 | 12/1968 | Pulcrano et al. | 410/74 |
| 3,450,066 | 7/1969 | Kasprzycki et al. | 410/68 |
| 3,498,238 | 3/1970 | Sweger | 410/70 |
| 3,604,363 | 9/1971 | Smith | 410/70 |
| 3,604,364 | 9/1971 | Sweger | 410/70 |
| 3,670,663 | 6/1972 | Sweger | 410/70 |
| 3,774,551 | 11/1973 | Sweger | 410/70 |
| 3,908,961 | 9/1975 | Hicks | 410/23 |
| 3,910,200 | 10/1975 | Girard | 410/70 |
| 4,114,718 | 9/1978 | Lipshield | 410/77 X |

Primary Examiner—Robert B. Reeves
Assistant Examiner—Howard Beltran
Attorney, Agent, or Firm—Hill, Van Santen, Steadman & Simpson

[57] ABSTRACT

Latch for locking a container to a pedestal on the flat deck of a flat car and particularly containers containing flammable materials. The container is supported on a pedestal at each corner thereof and the pedestals are adjustably mounted in guideways for movement along the deck of the flat car in accordance with the length of the container, to support containers at selected intervals along the car. A spring biased latch is provided to lock the container to the pedestal and a lock is provided for the latch is provided which reacts against the pedestal and includes a biasing spring for the lock to positively hold the latch in a locked position even though the car should be derailed.

7 Claims, 7 Drawing Figures

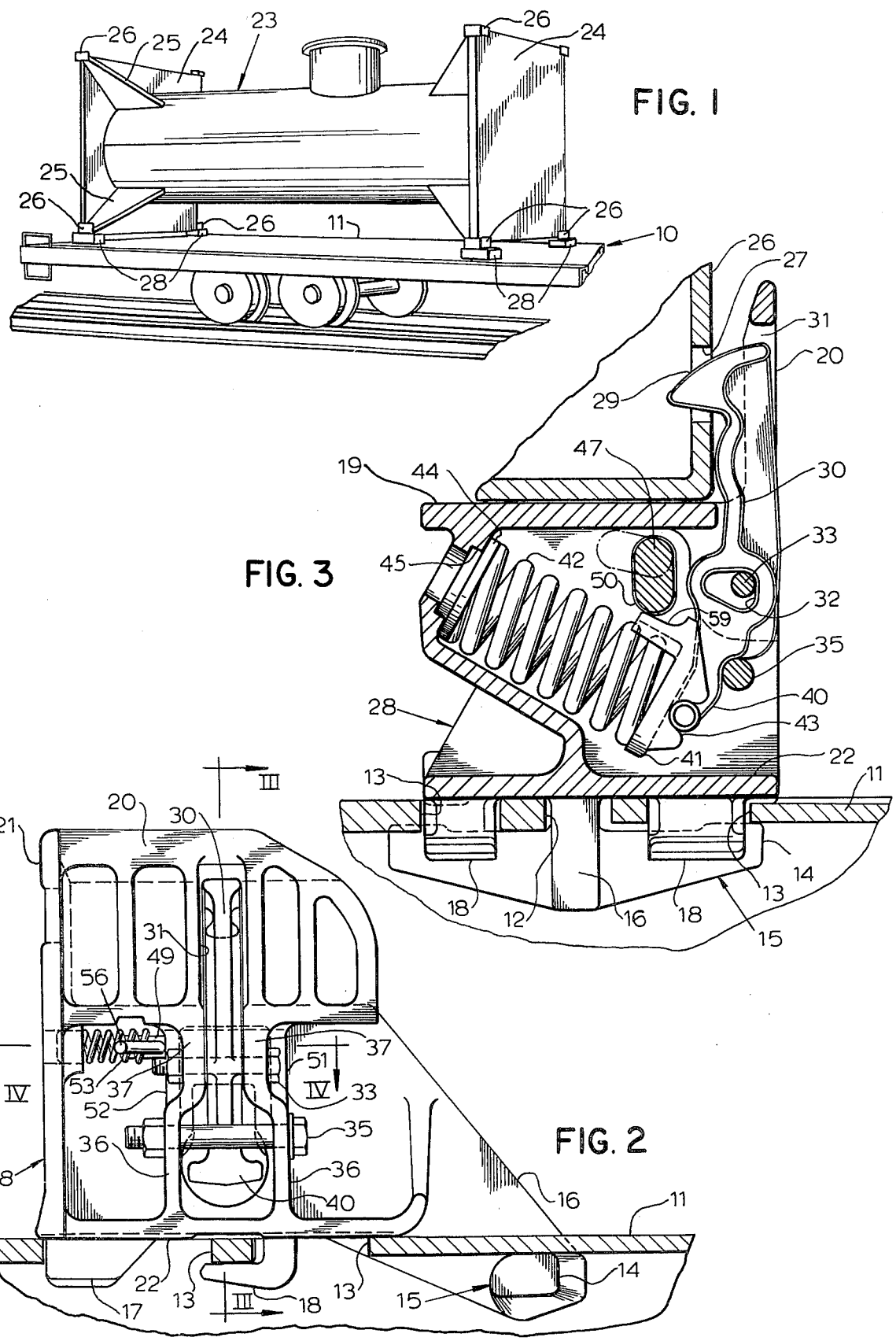

PEDESTAL CONTAINER LOCKING DEVICE

BACKGROUND OF THE INVENTION

Heretofore, containers have been supported on railway flat cars, flat bed trucks or other lading transporting vehicles on pedestals adjustable along the deck of the vehicle in accordance with the length of the container to be supported. The pedestals usually support the container at its corners, although where conditions require additional support, the pedestals may support the containers intermediate the ends of the containers as well as the corners thereof.

The containers may be of various forms and lengths and the flat cars have been adapted to carry one or more containers, which may vary in length, as disclosed in U.S. Pat. No. 3,391,654, which issued to Grob on July 9, 1968.

The Grob patent has slots extending along the deck of the flat car with notches spaced on opposite sides of the slots, to retain the pedestal in position and also has enlarged openings at the ends of the slots receiving a trunnion engaging beneath the surface of the deck and enabling the pedestal to be mounted on and slid along the deck in the correct position to register with corner fittings on the container. The notches spaced on opposite sides of the slots may receive shear lugs depending from the pedestal base and other notches may receive retainer lips extending to engage beneath the deck of the vehicle. Such construction is generally shown in United States Patents to Sweger, No. 3,604,364, dated Sept. 14, 1971 and 3,774,551, dated Nov. 25, 1973, and incorporated herein as a part of the present specification.

SUMMARY OF THE INVENTION

In accordance with the principles of the present invention, a spring biased latch is provided on each pedestal to lockingly engage the corner fittings of the container and a lock bar is manually movable to prevent the container from coming off the pedestal, even though the container may be placed under undue stresses, which would ordinarily cause the container to leave the car, particularly where the car may become derailed.

An object of the present invention is to provide container locking pedestals on flat cars positionable to support containers of varying lengths and shapes and particularly tank types of containers which may contain flammable liquids and retain the container to the pedestal even though the car should be derailed.

A further object of the invention is to provide a simplified and positive lock between a latch for locking the container to the pedestal and reacting against the spring seat for the latch, which is movable into position to hold the latch in latching position under loads greatly exceeding normal loads, in which the latch may be manually released when it is desired to remove the container from the flat deck vehicle.

An advantage of the invention is that containers containing combustible or flammable materials may be releasably locked to flat deck vehicles with a minimum liability of the container falling off the deck of the vehicle, even though the container may be subjected to major release forces.

A further advantage of the invention is the provision of pedestal support latches for the corners of a container containing explosive or flammable materials, assuring that the containers be safely transported on railway flat cars or other flat deck transporting vehicles.

These and other objects and advantages of the invention will appear from time to time as the following specification proceeds, and with reference to the accompanying drawings, wherein:

BRIEF DESCRIPTION OF THE DRAWINGS

FIG. 1 is a diagrammatic perspective view illustrating a portion of a flat car having a tank type of container locked to the flat deck thereof.

FIG. 2 is a view in side elevation of a pedestal locked to the flat deck of a flat car and showing the latch and locking and release mechanism therefor.

FIG. 3 is a fragmentary sectional view taken substantially along line III—III of FIG. 2.

DESCRIPTION OF THE PREFERRED EMBODIMENTS

Figure 4:
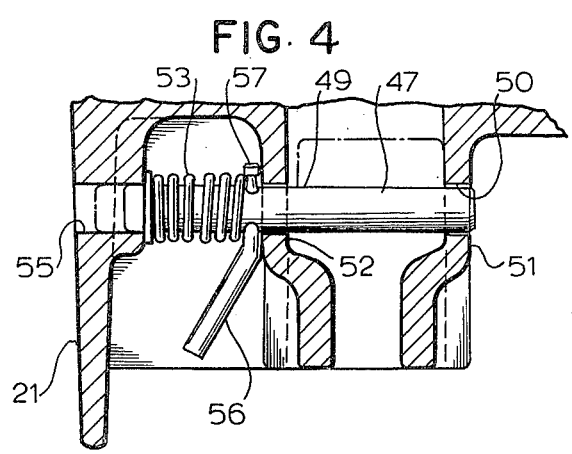
FIG. 4 is a sectional view taken substantially along line IV—IV of FIG. 2 and illustrating the release and locking mechanism for the latch.

In the embodiment of the invention illustrated in FIG. 1, I have illustratively shown a portion of a railway flat car 10 having a flat deck 11 having parallel slots 12 in the floor of the deck.

The slots 12 are interrupted along the length thereof and have enlarged open portions (not shown) at the ends thereof as in the aforementioned patent to Grob et al, 3,391,684. The enlarged portion (not shown) accommodates the insertion of trunnion wings 14 of a trunnion 15 to accommodate the insertion of an arm 16 of the trunnion for movement along the respective slot to engage guide lug 17 depending from a base 22 of a pedestal 28, and also to accommodate laterally spaced locking lips 18 depending from the base 22 of the pedestal to come under the underside of the floor plate of the railway flat car through which the notches 13 extend and are spaced to opposite sides of the slot 12.

The pedestal 28 has side and end walls 20 and 21 extending upwardly of a base 22 and has a platform 19 intermediate the ends of said side walls and spaced a substantial distance above the deck of the vehicle and forming a support for a container 23, illustratively shown as a tank type container, although it may be of various other well known forms. The container 23 has end rectangular bulkheads 24 at opposite ends thereof, braced to said container at each corner thereof by gussets 25. A corner fitting 26 is at each corner of the bulkhead. Said corner fittings may be like those shown in FIG. 2 of the Sweger U.S. Pat. No. 3,774,551, incorporated herein as a part hereof so not shown or described in detail, except to point out that each fitting has an outwardly facing vertical slot 27 for a strike 29 of a spring biased locking lever 30 biased to lock the container to the platform 19 of the respective pedestal as will hereinafter more clearly be described as the specification proceeds (FIG. 3).

The latch or locking lever 30 extends along a slot 31 of the side wall 20 and is somewhat similar in form to that shown in the Sweger U.S. Pat. No. 3,774,551, incorporated herein as a part hereof, so not shown or described in detail.

The locking lever 30 is pivoted on a transverse pivot pin 33 extending across the slot 31 and through a generally triangular open portion 32 of the locking lever 30, so arranged as to provide a variable pivot for said locking lever with the pin engaging rounded apices of said triangular open portion 32, depending upon the position of said locking lever 30 and strike 29 during the loading and unloading cycles and in the locked and release position of the latch. The pivot pin 33 is shown in FIG. 2 as being in the form of a bolt bolted to extend across the slot 31. The slot 31 extends vertically along the sidewall 20 as shown in FIGS. 2, 3, 5, 6 and 7. A second pivot pin 35 is spaced beneath a pivot pin 33 and extends across the open portion defined by the insides of parallel ribs 36 forming a widened downward continuation of the slot 31. The second pivot pin 35 is also shown as being in the form of a bolt bolted to parallel ribs 36 spaced outwardly of ribs 37 through which the pivot pin 33 is bolted. The ribs 37 form an enlargement of the lower end portion of said open portion 32 (FIG. 2). The pivot pin 35 reacts against a rounded shoulder of the latch lever 30 and limits inward movement of said latch lever as said latch lever is moved to its locked position. The latch lever 30 has a lower end portion 40 abutting a seat 41 for a compression spring 42.

The end 40 is in the form of a trunnion on the end of the lock lever 30 and extending beyond opposite sides of said lock lever. The seat 41 for the compression spring 42 has parallel spaced saddles 43 pivotably receiving the end portion of the ends 40 projecting beyond opposite sides of the latch lever 30 and forming bearings therefor.

The compression spring 42 is seated at its inner end on the seat 41 and at its outer end on a seat 44 mounted on the inner side of an angular wall portion 45 depending from the undersurface of the platform 19 of the pedestal 28, and generally parallel to the seating portion of the seat 41. The compression spring 42 is a relatively heavy spring biasing the strike 29 and locking lever 30 in the locking position shown in FIG. 3 and 6, and to provide sufficient force on the strike to hold a container to the base 19 of the pedestal 28 and requires a lifting force of 1,600–2,200 pounds in order to lift the container from the platform 19 with a straight upward lifting motion.

Figure 6:
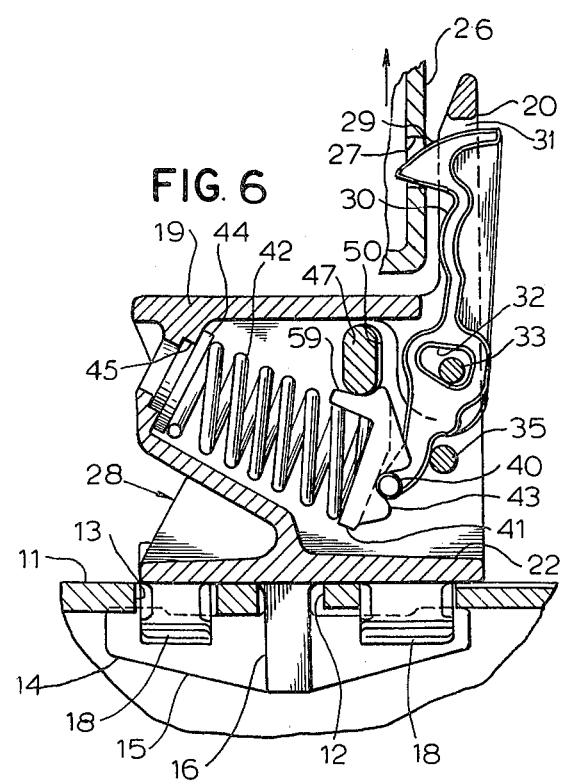
FIG. 6 is a view somewhat similar to FIGS. 3 and 5, but showing the latch in its locked position locking the container to the supporting platform of the pedestal.
Figure 7:
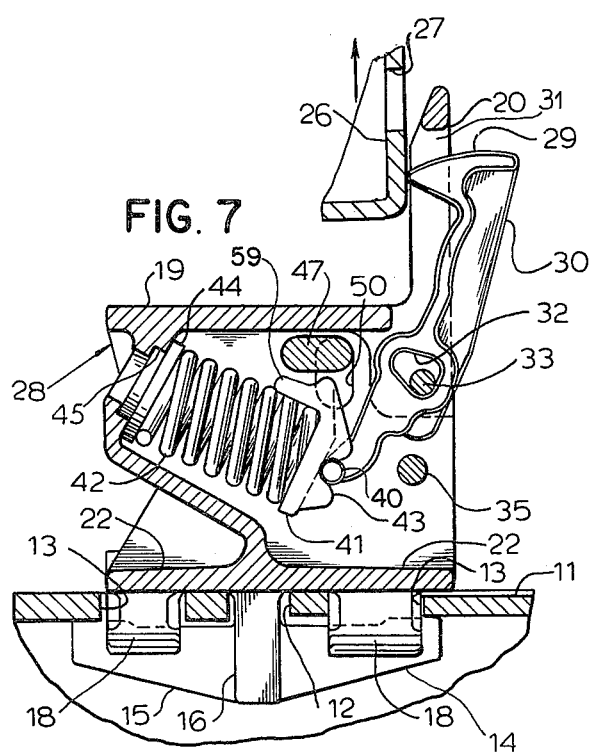
FIG. 7 is a view somewhat similar to FIGS. 5 and 6, but showing the locking mechanism released and showing the container and pedestal in an unloading cycle.

Referring now in particular to the locking arrangement for locking the lock arm 30 and strike 29, in the locked position shown in FIG. 6, a lock bar 47 is shown as formed integrally with a pivot pin 49 (FIGS. 2 and 4). The lock bar 47 and pivot pin 49 are inserted by passing the pivot pin through an elongated vertical opening 50 slightly larger than the lock bar and extending through a wall 51 of the pedestal, extending from the open portion 32.

As shown in FIG. 4, the pivot pin 49 passes through a wall 52 parallel to the wall 51 and through an outer depending portion of the wall 21 of the pedestal, depending from the platform 19.

As the lock bar and pivot pin 49 are passed through the opening or slot 50 in the wall 51, the pin 49 is then passed through a drilled or otherwise formed opening in the wall 52 parallel to the wall 51. As the pin passes through the wall 52, it is then passed through a compression spring 53 and through a drilled or otherwise formed opening 55 in the depending portion of the wall 21 of the pedestal.

The spring 53 may be compressed to accommodate the insertion of a locking lever 56 through the pin 49. The locking lever 56 is shown in FIGS. 2 and 4 as extending outwardly of the pin 49 and turned away from the wall 52 to accommodate ready access to said locking lever for moving the lock bar 47 from its release position shown in FIG. 7 to its locked position shown in FIG. 6. A headed pin 57 extends radially of the pivot pin 49 and is threaded or otherwise secured thereto. The pin 57 may be a part of the lever 56 and cooperates with the lever 56 to form a seat for the inner end of the spring 53.

It should here be noted that when the lock bar 47 is aligned with the opening 50, the spring 53 will bias the lock bar 47 into the opening 50 to support said bar against the outer side of the wall 51 and thereby effect support of the lock bar between the walls 51 and 52.

The lock bar 47 as shown in FIG. 6, is in position to engage a leg portion 59 of the spring seat 41. The leg portion 59 extends along the compression spring 42 in a direction away from the saddle 43 and the trunnion end portion of the lock lever 30.

The lock bar 47 in the position shown in FIG. 6 thus reacts against the leg portion 59 and positively holds the seat 41 from compressing the spring 42 which can only be attained by forces so great as to deform the leg portion and seat.

It should further be understood that the variable pivot for latch 30 in cooperation with the pin 40 accommodates movement of the container onto the platform 19 when the lock bar 47 is in engagement in the opening 50 in the side wall 51, even though the lock bar is in position to form a positive lock for locking the container to the car.

Forces of twice the weight of the container, which may be 33,600 lbs. per pedestal and over a required to release the latches against the lock bars 47. These forces are far above normal forces exerted against the latch levers even where the car may be derailed, and far greater forces would break the latch 30 or seat 41 for the spring 42, when it is attempted to remove the container when loaded or upon overturning or derailing of the car.

Figure 5:
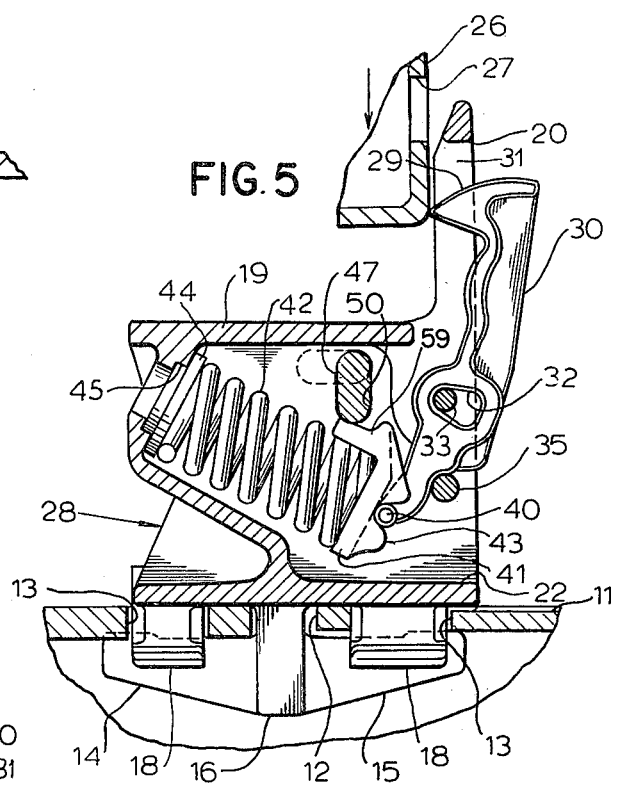
FIG. 5 is a view somewhat similar to FIG. 3 but showing a container in a loading cycle on the pedestal with the lock bar in a locked position.

In loading a container onto the pedestals 28, the corner fittings on the container are aligned with the pedestals so that the two right-angled walls of each pedestal will receive a corner fitting. The container is then lowered onto the platforms 19 of the pedestals and as lowered the strike surfaces 29 of the lock levers 30 are cammed outwardly to accommodate the corner fitting to move into engagement with the platform 19, as shown in FIG. 5. As the bottoms of the corner fittings move into engagement with the platforms 19, the springs 42 of each lock will move in to bias the strike 29 into engagement with the associated opening in the corner fitting. When the corner fittings come onto the platforms 19, the latches 30 will lockingly engage the openings in the corner fittings and positively lock the container to the deck of the flat car or other vehicle used to transport the container, as shown in FIG. 6.

When the container is locked in the position shown in FIG. 6, the lock bars 47 of each pedestal are in the slots 50 and in engagement with the leg portion 59 of the movable seats 41 for the spring 42 and positively lock the container to the pedestal and prevent the container from leaving the pedestals even when the car may be derailed.

It will be apparent to those skilled in the art that many modifications and variations may be affected without departing from the spirit and scope of the novel concepts of the present invention.

I claim as my invention:

1. A lading retaining means for a transporting vehicle having a flat deck in which the lading is in the form of a container having a corner fitting on at least four corners thereof and in the same horizontal plane, each fitting having a slot, receiving a latching lever for locking the container to the vehicle, a separate pedestal releasably supporting each corner of the container, and including a frame having a base, a platform spaced above said base, and end and sidewalls extending vertically of said platform and conforming to a corner fitting as the container is lowered onto said platform, one sidewall having a slot extending vertically therealong, parallel walls forming said slot, a latch lever extending along said slot between said parallel walls, a variable pivot for said latch lever, pivoting said latch lever between said parallel walls to move into said slot and into latching engagement with an associated corner fitting, said latch lever having an inwardly extending upper end having an upwardly facing strike surface, and having a lower end portion extending a substantial distance beneath said platform, a compression spring engaging the lower end portion of said latching lever and biasing said latching lever to engage said strike surface with a corner fitting as a container is lowered onto said platform, said compression spring having a movable seat its adjacent lower end of said latching lever and having a saddle on its end opposite said seat and adjacent the lower end portion of said latch lever, a stationary seat for an outer end of said spring means, said saddle having bearing engagement with said lower end portion of said latching lever, said movable seat for said compression spring having a leg portion extending along said spring for a portion of length thereof and a lock bar engageable with said leg portion and reacting against said movable seat and an adjacent wall defining a slot, preventing compression of said spring and thereby securely locking said latch lever from moving to a release position.

2. The lading retaining means of claim 1, wherein the lower end portion of said latch lever is spaced beneath said variable pivot and has pivotal engagement with said saddle, to effect compression of said spring means as said strike engages said corner fitting during lowering movement of a container thereon, and wherein an opening generally conforming to the form of said lock bar is in the side wall forming said slot adjacent said lock bar, and affords a means for assembling said lock bar to said frame and accommodates movement of said lock bar into registry with said opening, and axial movement of said lock bar along said opening to form a positive support for said lock bar and compression spring.

3. The lading securing means of claim 2, including a pivot pin forming a part of said lock bar and extending outwardly therefrom, spaced walls depending from said platform forming a pivotal mounting for said pivot pin, and spring means encircling said pivot pin and biasing said lock bar into engagement with said opening and said leg portion extending from said movable seat along said spring, to react thereagainst, and other means locking said lock bar out of engagement with said extension from said movable seat along said spring.

4. The lading securing means of claim 3, including a release handle extending from said pivot pin and forming a means for turning said lock bar into release and locking positions and accommodating axial movement of said lock bar by the bias of said spring means to insert said lock bar in said opening as said lock bar is moved into a locked position.

5. A lading retaining means for retaining lading to a flat decked transporting vehicle in which the lading is in the form of a container having a corner fitting on each corner thereof, in the same plane and in which each fitting has a vertical latch receiving slot, a pedestal supporting each corner fitting of the container, each having a base engageable with the flat deck of a vehicle, two right-angled walls extending upwardly of said base and forming side and end walls for engagement with the corner of a container, and a platform disposed intermediate the ends of said walls, forming a support for the container, said sidewalls each having parallel spaced vertically extending walls intermediate the ends thereof forming a vertically extending slot, a latch lever extending along said slot, a pivot pin for said latch lever extending across and mounted on said sidewalls beneath said platform, said latch lever having an enlarged opening disposed beneath said platform and through which said pivot pin extends, to form a variable pivot for said latch lever, a second pin disposed beneath said pivot pin and forming a reaction member for said latch lever as the container is lowered onto said platform during a loading cycle, said latch lever having a lower end portion disposed beneath said last mentioned pivot pin, a compression spring seated in said pedestal adjacent an outer end thereof, a movable seat for the inner end of said spring having a leg portion extending along said spring from the seating portion of said spring on said movable seat, a saddle on the side of said movable seat opposite said leg portion and biased by said compression spring to form a biasing member engaging the lower end portion of said latch, the improvement comprising locking means for said latch lever including an elongated lock bar movable to engage said leg portion and hold said seat from movement in a direction to effect compression of said spring, and release of the latch, an opening in one wall of said parallel walls forming said slot, adjacent said lock bar, to accommodate assembly of said lock bar to engage said leg portion when said lock bar is in a locked position, means selectively operable to pivotally move said lock bar to engage said movable seat and axially move said lock bar to fit into said opening when in a locked position, to retain said lock bar in a locked position and prevent pivotal movement thereof upon the exertion of pressure on said compression spring by said latch.

6. The locking means of claim 5, including a pivot pin extending from said lock bar in a direction away from said slot and forming a pivotal mounting for said lock bar and pivotally supporting said lock bar for movement into and out of engagement with said seat and slot as selected.

7. The container latch of claim 6, in which a lever extends from said pivot pin, spring means encircle said pivot pin and engage said lever and bias said lock bar into position to engage said slot and release said lock bar from said slot by axial movement of said pivot pin and lock bar out of said slot and turning movement of said lock bar out of engagement with said seat.

* * * * *